Feb. 16, 1960   R. F. ZUMWALT   2,925,262
LIQUID SPRING
Filed Sept. 5, 1956   2 Sheets-Sheet 1
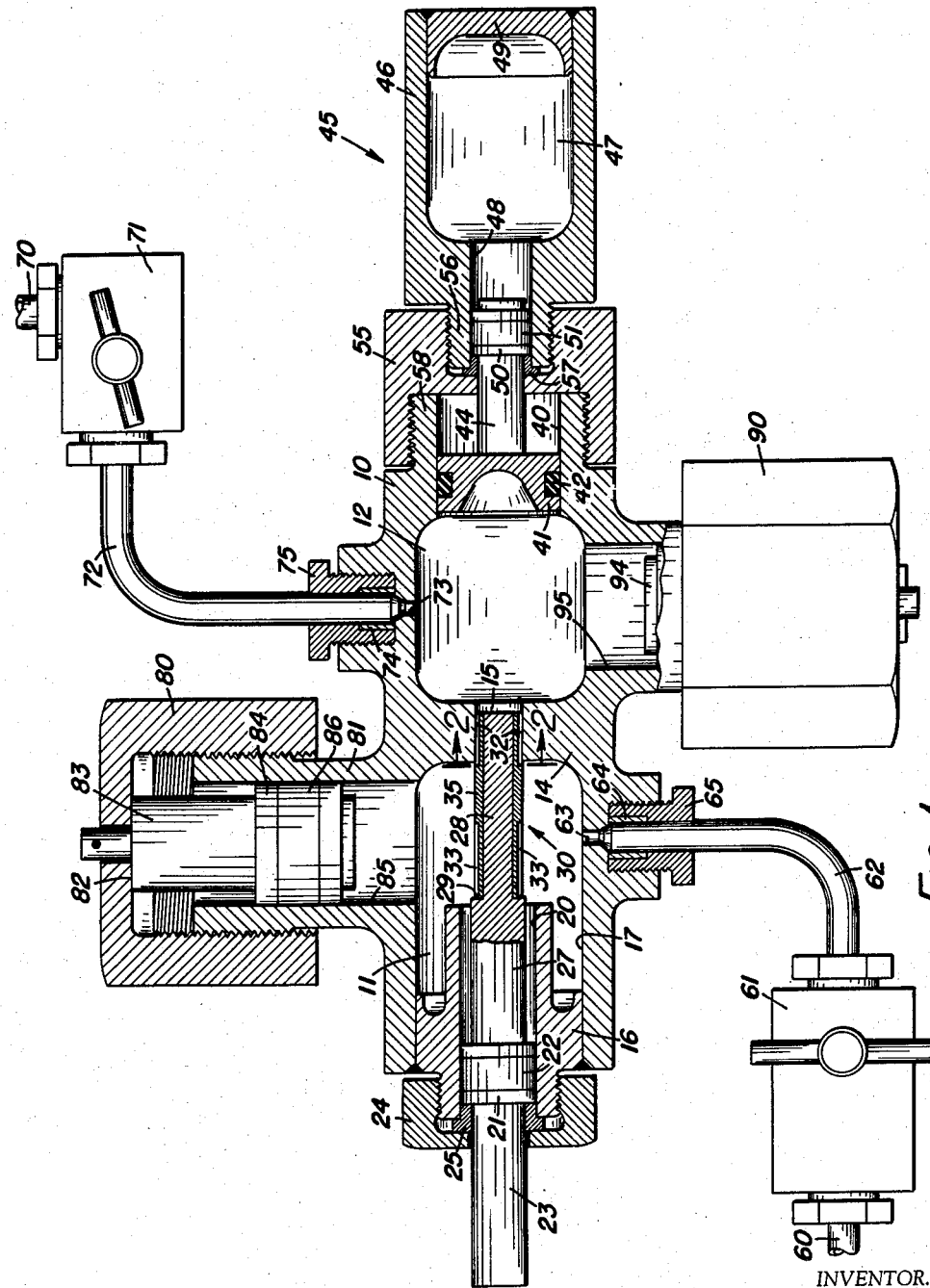
FIG. 1.
INVENTOR.
ROBERT F. ZUMWALT
BY 
ATTORNEY Feb. 16, 1960 R. F. ZUMWALT 2,925,262
LIQUID SPRING
Filed Sept. 5, 1956 2 Sheets-Sheet 2

INVENTOR.
ROBERT F. ZUMWALT
BY
ATTORNEY

United States Patent Office 2,925,262
Patented Feb. 16, 1960

2,925,262

LIQUID SPRING

Robert F. Zumwalt, Tonawanda, N.Y., assignor to George F. Wales, Kenmore, N.Y.

Application September 5, 1956, Serial No. 608,144

14 Claims. (Cl. 267—1)

The present invention relates to liquid springs, and more particularly to an adjustable variable rate liquid spring.

While liquid springs are well known, liquid springs of the construction heretofore available have been limited in their applications. Conventional liquid springs have had generally linear characteristics and are not adaptable to situations requiring non-linear operating characteristics. For instance, the conventional liquid spring is not suitable for use in any application where the force or acceleration applied to the spring must have a varying rate of rise and a relatively slow return to zero, as for instance in a rebound shock device utilized for test purposes. Mechanical types of springs and other shock absorbing devices are not able to produce the desired result, nor are the linear type liquid springs suitable for the purpose.

One object of the present invention is to provide a multiple rate compressible liquid spring having non-linear operating characteristics.

Another object of the invention is to provide a multiple rate liquid spring in which the spring rate is variable and adjustable.

Another object of the invention is to provide a liquid spring having means for dissipating energy and controlling the ratio between the input and the output energy.

Another object of the invention is to provide a liquid spring in which the shape of the force curve, and the points of slope change of this curve are controllable.

A further object of the invention is to provide a liquid spring in which the range of the force-stroke curve of the spring can be controlled by variations in the initial pressure in the primary chamber of the spring.

A further object of the invention is to provide a liquid spring in which the slope of the force-stroke curve of the spring may be controlled by varying the working volumes of liquid in the spring.

Still another object of the invention is to provide a liquid spring in which the working volumes of liquid in the spring, the initial pressures of the liquid, and points of change of the slope of the force-stroke curve of the spring can be varied, that is, the entire force-stroke curve of the spring can be almost completely controlled and varied within the design limits of the spring.

A still further object of the invention is to provide a liquid spring in which all the force-stroke curve variables, except the points of inflection relative to the stroke, can be controlled externally without disassembly of the spring.

Other objects of the invention will be apparent hereinafter from the specification and from the recital of the appended claims when taken in conjunction with the accompanying drawings.

In the drawings:

Fig. 1 is a view partly in elevation, but principally in longitudinal section, showing an adjustable variable rate liquid spring built according to one embodiment of this invention;

Figure 2:
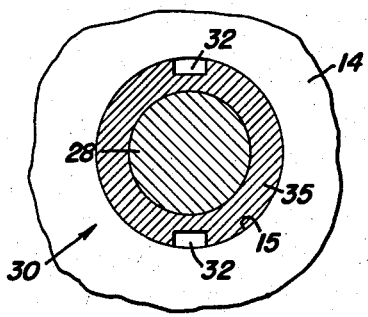
Fig. 2 is a section on the line 2—2 of Fig. 1 looking in the direction of the arrows.

In general the spring shown in the drawings comprises two liquid chambers connected in series by a port. For the purpose of distinction between them these chambers are called the primary chamber and the secondary chamber, respectively. These two chambers are filled with a compressible liquid such as a silicone liquid. A reciprocating piston, known as the main piston, operates in a cylinder in the primary chamber. The bore of this cylinder is coaxial with the port between the two chambers. Connected rigidly with the reciprocating piston is a sleeve-type poppet valve. This poppet valve reciprocates, upon reciprocation of the main piston, through the port connecting the two chambers. The poppet valve contains two sets of bleed slots which are axially spaced from one another and which, when operative, permit the passage of the compressible liquid from one chamber to the other. The position of the poppet valve relative to the port determines, therefore, whether the two chambers are in communication, or are closed off from one another, and determines, therefore, whether the two chambers operate in unison, or independent of one another.

In the secondary chamber there is a floating piston whose function is to limit the pressure rise of the liquid in that chamber. The movement of the floating piston, which results from displacement of liquid by the poppet valve, is restricted by an auxiliary spring, which in the instance shown is a conventional liquid spring. The movement of the floating piston is controlled by the stiffness of this auxiliary spring and by the pressure to which the floating piston is subjected.

The prime control of the path of the force-stroke diagram of the device is the poppet valve. If the poppet valve were not provided, the primary and secondary chambers in combination with the floating piston would function as a single chamber. The design of the poppet valve, and the position of the bleed slots therein affect the path and shape of the force-stroke curve of the device more than any other factor.

Initially the primary chamber is connected to the secondary chamber by one set of bleed slots in the poppet valve. As the main piston is depressed from its at-rest position, the liquid in both the primary and secondary chambers is compressed slightly as the floating piston deflects, compressing the auxiliary spring slightly. When the first set of bleed slots of the poppet valve have been closed off by movement of that valve with the main piston, the primary chamber is shut off from the secondary chamber and the liquid in the primary chamber is compressed at a very high rate resulting in a rapid increase in the pressure resisting movement of the main piston. The increase in pressure of the liquid trapped at this time in the primary chamber far exceeds the increase in pressure of the liquid in the secondary chamber, because any tendency of the liquid displaced by the poppet valve to increase the pressure in the secondary chamber is dissipated by movement of the floating piston against the reaction of the auxiliary liquid spring. Continued movement of the main piston, however, through the operating stroke eventually pushes the poppet valve through the port between the primary and secondary chambers to such a position that the second set of bleed slots in the poppet valve connects the primary chamber once again with the secondary chamber. Since the pressure in the primary chamber at this movement exceeds the pressure in the secondary chamber, there is a sudden transfer of liquid from the primary chamber to the secondary chamber which causes a pressure drop in the primary chamber and a pressure rise in the secondary chamber. The chamber pressures are thereby equalized.

On completion of the inward stroke on the main piston, the expanding liquid in the primary and secondary chambers forces this piston outwardly, aided by the pressure of the auxiliary liquid spring on the floating piston in the secondary chamber, until the main piston has moved far enough on its return stroke for the poppet valve to again close off the primary chamber from the secondary chamber. Then the return stroke continues at a faster rate until the pressure in the primary chamber has been reduced to zero. Then the main piston in its return stroke will have moved far enough for the poppet valve to again open the primary chamber to the secondary chamber so that the pressure of the liquid in the secondary chamber will complete the return movement of the main piston to its starting position.

Referring now to the drawings by numerals of reference, 10 denotes the housing of the main liquid spring. This housing is formed with a primary chamber 11 and with a secondary chamber 12. A partition wall 14 formed in the housing separates the two chambers 11 and 12; but these two chambers are connectable with one another through a bore or port 15 that extends through the partition wall 14. The outer end of the chamber 11 is closed by a plug 16 that is brazed or welded around its periphery to the side wall 17 of the chamber 11.

The plug 16 is formed with a centrally disposed bore which constitutes a guide cylinder 20. A piston 21 is mounted to reciprocate in the guide cylinder 20. This piston carries a conventional nylon or other seal 22 to prevent leakage of liquid from the chamber 11 outwardly along the piston. The piston has at one end a piston rod 23 which projects outwardly of the chamber 11 through an opening in the closure plug 16. A nut 24, which threads on the closure plug, and a seal 25, which is held in position by the nut 24, serve to limit outward movement of the piston 21.

Within the chamber 11 the main piston 21 is formed with a portion 27 of reduced diameter which extends inwardly beyond the piston head 21; and this portion 27 is further reduced in diameter as denoted at 28 to form a shoulder 29.

Seated on and around the reduced diameter portion 28 of the main piston 21 and fixed thereto, as by shrinking it on the reduced diameter portion 28, is a poppet sleeve valve 30. This valve is formed with two sets of axially spaced bleed slots. One set of these slots comprises two axially-extending diametrally-opposed recesses 32 (Fig. 2) which extend from the inner end of the valve forwardly for a portion of its length. The other set of bleed slots comprises two other axially-extending diametrally-opposed recesses 33 which extend from the outer end of the valve inwardly for a portion of its length. The diameter of the valve is such that it will slide snugly through the bore 15; and when the unrecessed portion 35 of the valve is in the bore 15, the valve will close off the chamber 11 from the chamber 12 and prevent flow of liquid through the bore 15.

Mounted to reciprocate in a cylindrical guide portion 40 formed in the secondary chamber 12 is a floating piston 41. This piston carries in a peripheral recess an O-ring or other suitable seal 42 which engages the walls of the cylindrical guide surface 40 to prevent leakage of liquid from the chamber 12 outwardly along the piston 41.

The piston 41 is normally held in the position shown in Fig. 1 by the rod or plunger 44 of a conventional liquid spring 45. This spring comprises a container or housing 46 which is provided with a chamber 47 that is formed at one end with a cylindrical guide bore 48 and that is closed at its other end by a plug 49. The plug 49 is brazed or otherwise fastened in the housing. A piston 50, with which the piston rod 44 is integral, reciprocates in the cylindrical guide portion 48. This piston carries a nylon or other suitable seal 51, to prevent leakage of liquid from the chamber 47 outwardly along the piston 50. The forward end of the piston rod 44 abuts against the rear face of the floating piston 41.

The liquid spring 45 is secured to the housing 10 by an adapter nut 55 into which the reduced diameter neck portion 56 of the housing is threaded, and which threads onto a reduced diameter neck portion 58 of the housing 10. A combined seal and stop 57 is held in place in the forward end of guide bore 48 by nut 55. The part 57 acts as a forward limit stop for piston 50.

The chambers 11, 12 and 47 are adapted to be filled with a compressible liquid such as a silicone liquid. This liquid may be supplied to the chamber 11 from a pump not shown through the piping 60, a valve 61, and the piping 62. The valve 61 is simply a conventional shut-off valve to shut off the supply line from the pump when the desired preload pressure has been obtained in the chamber 11. The pipe 62 communicates with the chamber 11 through the duct or port 63 in one side wall of the housing 10. The piping 62 is secured in position by means of a conventional nipple 65 which contains a packing gland 64.

Similarly liquid under pressure is supplied to the chamber 12 from a pump (not shown) through piping 70, a conventional shut-off valve 71, and piping 72. Piping 72 communicates with the chamber 12 through a port or duct 73; and the piping 72 is held in position by a packing gland 74 and a nipple 75 which threads into the housing 10.

The volume of liquid in the chamber 11 is controlled by an adjustment nut 80 which threads on a lateral protrusion or boss 81 which extends laterally of the housing 10. This nut engages a shoulder 82 on the shank or rod 83 of a piston 84 that is adjustable by means of the nut in the cylindrical guide bore 85 of the extension 81 and that is freely movable therein. A nylon or other suitable seal 86 is mounted on the piston 84 to prevent leakage of liquid from the chamber 11 along the piston 84. Guide bore 85 communicates with chamber 11 and in effect is part of that chamber. The guide bore 85, like the rest of the chamber 11, is filled to the extent allowed by the adjusted position of piston 84 with the compressible liquid.

In similar manner the adjustment of the volume of the liquid in the chamber 12 can be controlled by an adjustment nut 90 which engages the shoulder on a piston 94 similar to the piston 84. This nut threads on a lateral cylindrical extension 91 of housing 10; and the piston 94 reciprocates in a cylindrical bore 95 formed in this extension and communicating with the chamber 12. The bore 95, like the rest of chamber 12, is filled to the extent allowed by the adjusted position of piston 94 with the compressible liquid.

The conventional liquid spring 45 is filled in conventional manner with the compressible liquid.

The operation of the device will be understood from the preceding description, but may be briefly summed up here.

When an outside force is applied to the piston rod 23 the main piston 22 is moved inwardly in the housing 10, compressing the liquid in the primary and secondary chambers slightly through operation of the piston 21. The pressure of the liquid on the floating piston 41, whose area is greater than the area of the piston 21 plus the area of the poppet valve piston rod assembly 30—28, however, at this time causes the auxiliary liquid spring 45 to take up most of the pressure. When the piston 21 has moved far enough inwardly, though, for the poppet valve section 35 to enter the bore 15, then the primary chamber 11 is shut off from the secondary chamber 12. As the poppet valve moves inwardly in the bore 15 it compresses the liquid in the chamber 12 somewhat, but the compression of this liquid is again absorbed by the auxiliary spring 45. It is the liquid in the primary chamber 11 which is most compressed when the chambers 11 and 12 are shut off from one another. The liquid in the chamber 11 is compressed at a very high rate resulting in a rapid increase in the pressure in that chamber. Continued inward movement of the main piston 21 eventually pushes the poppet valve 30 through the port 15 to a position such that the secondary bleed slots 33 in the poppet valve again permit communication of the two chambers 11 and 12. Since the pressure in the primary chamber 11 exceeds the pressure in the secondary chamber 12 there is at this moment a sudden transfer of liquid from the primary chamber 11 to the secondary chamber 12 which causes a sudden pressure drop in the primary chamber and a pressure rise in the secondary chamber. The chamber pressures are thereby equalized.

Upon completion of the working stroke of the main piston 21 and relief of the force on the piston rod 23, the liquid in the three chambers 11, 12 and 47 expands, the piston 50 and piston rod 44 causing return movement of the floating piston 41, and the expansion of the liquid in the chambers 11 and 12 causing return movement of the piston 21. This return movement continues at a low rate until the poppet valve in its movement with the piston 21 again closes off the port 15. Then the return movement of the piston 21 is caused primarily by the expansion of the liquid in the primary chamber 11. When the poppet valve 30 has moved far enough, however, for its bleed slots 32 to again establish communication between the two chambers 11 and 12, the pressure in chamber 11 will have dropped substantially to zero. From then on, in the return stroke, the principal pressure will be on the exposed surfaces of the poppet valve assembly 30—28; and the liquid will flow from chamber 12 into chamber 11 until piston 21 has returned to initial position.

Figure 3:
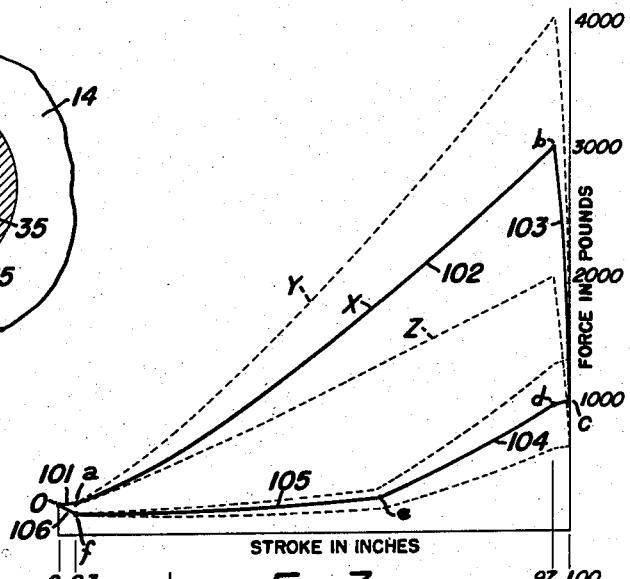
Fig. 3 is a force-stroke diagram showing several different ways in which the spring can be adjusted to operate.

One way in which the spring of Fig. 1 may operate is illustrated diagrammatically in Fig. 3. In this diagram 0 represents the normal starting point of the spring or its at-rest position. It may, or may not, be under some pre-load in this position. During the first part of movement of the piston 21, the bleed slots 32 permit communication between the chambers 11 and 12 and the rise in pressure of the liquid in these chambers is very slight. This is represented by the line 101. At the point a, the poppet valve section 35 enters the bore 15 and seals off the primary chamber from the secondary chamber. After the primary and secondary chambers have been sealed off from one another, the pressure in the primary chamber rises very rapidly, this rise in pressure being denoted in the diagram of Fig. 3 by the line 102. The pressure of the liquid in the primary chamber will rise at a much more rapid rate than in the secondary chamber since the liquid in the primary chamber will be compressed, after sealing off of the two chambers from one another, by the amount by which the liquid in the primary chamber is displaced by the main piston 21. The pressure in the secondary chamber 12 rises at a lesser rate due to the fact that any rise in pressure of the liquid in that chamber is reflected by movement of the floating piston 41 against the auxiliary spring 45. The spring 45 will be selected, of course, so that the pressure, which it exerts contra to valve-piston assembly 30—28 will be less than the pressure built up by that assembly. When the primary and secondary chambers are sealed off from one another the diameter of the poppet valve 30 is the active piston area in the secondary chamber. The difference between the area of the major diameter of the main piston 21 and the area of the poppet valve assembly 30—28 is the piston area acting in the primary chamber. The total force developed by the main piston is the sum of the two. The amount of force developed resulting from the pressure rise in the primary chamber is great, therefore, as compared with the force developed in the secondary chamber. The amount of force developed by the system and the individual chamber-piston combination is controlled by the design of the device itself.

The rise in pressure in chamber 11 continues to the point b where the poppet valve 30 has moved far enough for the bleed slots 33 to connect the primary chamber 11 again with the secondary chamber 12. At this point there is a sudden pressure drop, denoted by the line 103, to the point c.

In the return half of the operating cycle, the expanding liquid in the chambers 11, 12 and 47, forces the piston 21 to the left until the portion 35 of the poppet valve again seals off the port 15. Until this occurs the piston return is at the spring rate developed by the total system of the combined primary and secondary chambers in series with the floating piston. When the poppet valve 30 has again sealed off the primary chamber from the secondary chamber, which occurs at the point denoted at d in the diagram the rate of load drops sharply due to the fact that the liquid in the primary chamber 11, which acts on the major portion of the reciprocating piston 21, expands at a faster rate than the liquid in the secondary chamber, which at most can only act on the area of the poppet-piston assembly 30—28 that is exposed to the liquid in secondary chamber 12.

When the liquid in the primary chamber has expanded to zero, which is denoted at the point e in the diagram, the only force on the reciprocating piston returning it to its fully extended initial position is the pressure in the secondary chamber acting against the piston-poppet assembly. Thus the return rate, denoted by the line 105 is quite flat to the point where the first set of bleed slots 32 again connects the primary chamber with the secondary chamber. This occurs at the point f in the diagram. Then the total area of the main piston is exposed to the further reduced pressure due to venting the primary chamber at zero pressure to the existing low pressure in the secondary chamber. This stabilized pressure, denoted by the line 106 in the diagram, returns the main piston to its original position O.

The return half of the operating cycle starts with the curve and the force-stroke diagram dropping slightly from the point c to the point d. Then the poppet valve again seals off the port 15. The curve from the point d to the point e is produced by the slowly expanding liquid in the secondary chamber acting on the poppet valve 30 in conjunction with the rapidly expanding oil bearing on the remaining area of the main piston in the primary chamber. The curve from the point e to the point f is produced by the relatively low pressure bearing on the small area of the poppet valve. At the point f the first series of bleed slots 32 again connects the primary and secondary chambers, and the pressure in the secondary chamber is vented into the primary chamber. The curve from the point f to the starting position O is created by the stabilized system pressure acting on the total piston area.

Through adjustment of the pistons 84 and 94 in the primary and secondary chambers, the volume of liquid in those chambers can be controlled. These pistons control the independent spring rate of each chamber as well as the spring rate of the system when the chambers are vented to each other. The initial starting load is controlled by the pressure to which the chambers or complete system is pre-charged through the external pressure lines 62 and 72. Further adjustment can be effected by varying the amount of travel allowed the floating piston and by the spring rate of the auxiliary piston. All adjustments, which can be made by the adjustment pistons 84 and 94 and the external pressurizing means 62, 72 can be made without disassembly of the system. Limits for the travel of the floating piston 41 can be made by adjustment of the adapter nut 55 alone. The rate of the auxiliary spring can be changed by installing different springs, or in the case shown, the rate of the auxiliary spring can be changed by changing the liquid in the auxiliary spring.

In Fig. 3 the full lines X denote the force-stroke curve under an average adjustment of the spring. With the minimum volume of liquid in the liquid chambers 11 and 12, the maximum spring rate can be obtained. The force-stroke curve for this condition is shown in the dash lines at Y. With the maximum volume of liquid in the chambers 11 and 12, the minimum spring rate is obtainable, as shown by the dash-dot line Z.

A further adjustment possible and probably one which will permit greater variation and distortion of the force-stroke diagram can be made by changing the poppet valve itself. Poppet valves with different lengths and positions of bleed slots can be provided, thereby to control the point at which the primary and secondary chambers are vented to each other and sealed off from each other.

Figure 4:
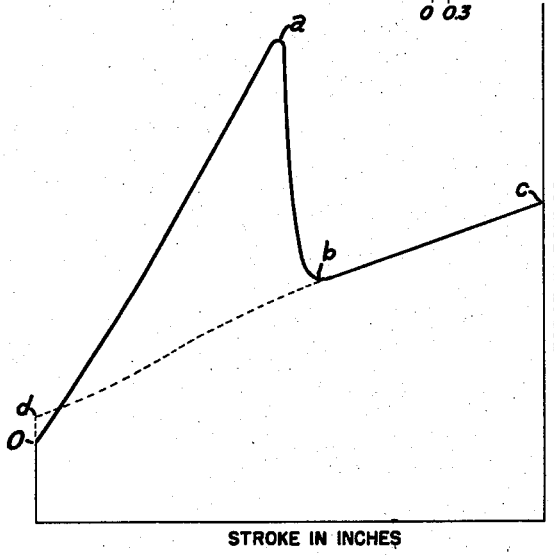
Fig. 4 is a further force-stroke diagram showing another way in which the spring may be adjusted to operate.
Figure 5:
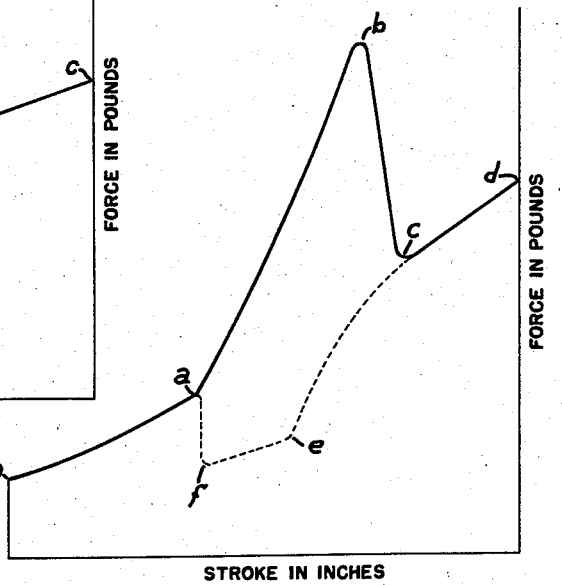
Fig. 5 is a force-stroke diagram showing a still further way in which the spring may be adjusted to operate.

The force-stroke diagrams of Figs. 4 and 5 illustrate variations in the spring rate obtainable through altering of the bleeds in the poppet valve.

The force-stroke diagram of Fig. 4 shows the curve produced when the primary chamber and secondary chamber are sealed from each other at the start of the operating cycle. In this case, the pressure rise in the device is quite rapid until point $a$ is attained where the bleed slots 33 allow communication of chambers 11 and 12. Then there is an extremely rapid fall in pressure for a short portion of the working stroke of main piston 21 with a gradual rise in pressure again until the working stroke of the piston is completed at point $c$. On the return stroke of the piston a corresponding gradual fall in pressure, due to expansion of the liquid in now-communicating chambers 11 and 12 takes place until chambers 11 and 12 are again sealed off from one another by poppet valve 30. The piston 21 will then have returned to initial position. Further variations are obtainable through altering initial operating pressures in each chamber. A still further variation is obtainable through the volume adjustment of the amount of liquid in either or both chambers.

The force-stroke diagram of Fig. 5 represents the curve obtained when the chambers are sealed off from each other for only a minor portion of the total operating stroke. The sudden rise to the peak of the curve is again produced principally by the rapid change of pressure rise due to sealing off the primary chamber from the secondary chamber and the resultant compression of the liquid to a higher degree in the primary chamber.

The same letters are used in the diagrams of Figs. 4 and 5 as in Fig. 3 to denote the same points at which different steps in the operation of the spring occur.

While the invention has been described in connection with a specific embodiment thereof and particular uses therefor, it will be understood that it is capable of further modification and use, and this application is intended to cover any variations, uses, or adaptations of the invention following, in general, the principles of the invention and including such departures from the present disclosure as come within known or customary practice in the art to which the invention pertains and as may fall within the scope of the invention or the limits of the appended claims.

Having thus described my invention, what I claim is:

1. A liquid spring comprising a plurality of rigid chambers filled with a compressible liquid and freely communicating with each other under zero-load conditions, an imperforate piston movable inwardly of one of said chambers upon application of an outside force thereto, and means movable by said piston within each of said chambers for successively closing off said chambers from communication with one another and for putting said chambers into communication with one another during a working stroke of said piston, said piston being responsive to expansion of said liquid to be returned thereby.

2. A liquid spring comprising a housing having two chambers therein and a normally open port connecting said chambers, a compressible liquid filling both said chambers, an imperforate piston movable inwardly of one of said chambers upon application of an outside force thereto, valve means connected to said piston to be operated thereby to close off said port during inward movement of said piston, and a pair of additional means each in fluid communication directly with only one of said chambers respectively for separately varying the pressure of the liquid in the two chambers, said piston being responsive to expansion of said liquid to be returned thereby.

3. A liquid spring comprising a housing having two chambers therein and a normally open port connecting said chambers, said chambers being filled with a compressible liquid, a piston movable inwardly of one of said chambers upon application of an outside force thereto, valve means connected to said piston to be operated thereby to close off said port during inward movement of said piston, and additional means for separately varying the volume of each of the two chambers.

4. A liquid spring according to claim 3 having means also for separately varying the pressure of the liquid in each of the two chambers.

5. A liquid spring comprising a housing having two chambers therein and a port connecting said chambers, said chambers being filled with a compressible liquid, a main piston movable inwardly into one of said chambers upon application of an outside force thereto, valve means having a movable sealing surface adapted to engage said port and positively connected to said piston to be operated thereby in both directions and movable at all times therewith to control the opening and closing of said port, said main piston being operative on inward movement when said port is open to increase the pressure on both of said chambers, a floating piston reciprocable in the other chamber, and liquid spring means constantly urging said floating piston toward said main piston.

6. A liquid spring comprising a housing having two chambers therein and a port connecting said chambers, said chambers being filled with a compressible liquid, a main piston axially aligned with said port and reciprocable in one of said chambers, a sleeve valve carried by said main piston and slidable in said port and having bleed slots along part of its length to permit communication between said chambers and being formed along another part of its length to close said port, a floating piston reciprocable in the other chamber, and spring means constantly urging said floating piston toward said main piston, the effective area of said floating piston being greater than the area of said port.

7. A liquid spring according to claim 6 in which the effective area of said floating piston is greater than the effective area of said main piston and of said port combined.

8. A liquid spring according to claim 6 having separate means for supplying liquid to said two chambers, respectively.

9. A liquid spring according to claim 6 having separate means for adjusting the volumes of said two chambers, respectively.

10. A liquid spring comprising a housing having two chambers therein and a port connecting said chambers, said chambers being filled with a compressible liquid, a main piston reciprocable in one of said chambers and movable inwardly of said one chamber upon application of an outside force to said piston to compress the liquid in said one chamber, a sleeve valve secured to said main piston to reciprocate therewith and through said port, said sleeve valve being provided along part of its length with bleed slots to permit communication between said chambers through said port and being formed along another part of its length to close said port, a floating piston reciprocable in the other chamber, spring means constantly urging said floating piston inwardly of said other chamber, each of said chambers being formed with a lateral extension constituting a cylinder that communicates with the respective chamber and forms part thereof, a volume-controlling piston slidably adjustable in each of said cylinders, means for separately adjusting each of said volume-controlling pistons to control the volume of its respective chamber, and means for separately supplying liquid to the two chambers.

11. A liquid spring comprising in combination: an inflexible container having a chamber; a compressible liquid filling said chamber; a first piston reciprocable in said container and movable in one direction in said container, upon application of an outside force to said pattern, to compress said liquid, and movable in the opposite direction by expansion of said liquid upon release of said force; a second piston carried by said container and adapted to be selectively positioned for adjusting the volume of said chamber; a source of liquid under pressure in communication with said chamber; and means to control said communication to selectively alter the quantity of liquid in said chamber.

12. A liquid spring comprising: an inflexible container having a pair of chambers in fluid communication with each other; a compressible liquid filling said chambers; a first piston reciprocable in said container and movable inwardly of one of said chambers, upon application of an outside force thereto, to compress said liquid, and movable in the opposite direction by expansion of said liquid upon release of said force; a valve operated by said first piston to close off and to reopen said fluid intercommunication during the inward movement of said first piston; a second piston carried by said container and adapted to be selectively positioned for adjusting the volume of one of said chambers; and separate means in fluid communication with one of said chambers for selectively altering the quantity of said liquid in said chambers.

13. A liquid spring comprising: an inflexible container having a pair of chambers in fluid communication with each other; a compressible liquid filling said chambers; a first piston reciprocable in said container and movable inwardly of one of said chambers, upon application of an outside force thereto, to compress said liquid, and movable in the opposite direction by expansion of said liquid upon release of said force; a valve operated by said first piston to close off and to reopen said fluid intercommunication during the inward movement of said first piston; a second and a third piston carried by said container and each adapted to be individually selectively positioned for adjusting the volume of each of said chambers, respectively; and separate means in fluid communication with one of said chambers for selectively altering the quantity of said liquid in said chambers.

14. A liquid spring comprising in combination: an inflexible container having a chamber; a compressible liquid filling said chamber; a first piston reciprocable in said container and movable in one direction in said container, upon application of an outside force to said piston, to compress said liquid, and movable in the opposite direction by expansion of said liquid upon release of said force; a second larger piston carried by said container and movable by said liquid during the compression thereof in a direction fluidly away from said chamber; resilient means carried by said container for yieldably reacting on said second piston with a force sufficient to permit compression of said liquid; and rigid means carried by said container for unyieldably reacting on said second piston after a predetermined amount of compression of said liquid.

References Cited in the file of this patent

UNITED STATES PATENTS

| | | |
|---|---|---|
| 1,505,036 | Lanchester | Aug. 12, 1924 |
| 2,566,736 | Levy | Sept. 4, 1951 |
| 2,723,847 | Hogan | Nov. 15, 1955 |
| 2,729,440 | Wales | Jan. 3, 1956 |
| 2,743,741 | Ord | May 1, 1956 |
| 2,773,517 | Hooper et al. | Dec. 11, 1956 |
| 2,793,031 | Hartel | May 21, 1957 |

FOREIGN PATENTS

| | | |
|---|---|---|
| 563,913 | France | Oct. 6, 1923 |
| 615,549 | Great Britain | Jan. 7, 1949 |